United States Patent
Hsu

(10) Patent No.: US 7,484,952 B2
(45) Date of Patent: Feb. 3, 2009

(54) AIRTIGHT MECHANISM OF A MOLD-HOLDING UNIT FOR FORMING A VACUUM ENVIRONMENT AROUND A HELD MOLD

(75) Inventor: Sheng-Tzu Hsu, Taipei (TW)

(73) Assignee: King Steel Machinery Co., Ltd., Taichung (TW)

( * ) Notice: Subject to any disclaimer, the term of this patent is extended or adjusted under 35 U.S.C. 154(b) by 174 days.

(21) Appl. No.: 11/701,545

(22) Filed: Feb. 2, 2007

(65) Prior Publication Data

US 2008/0111051 A1     May 15, 2008

(30) Foreign Application Priority Data

Dec. 11, 2006  (TW) .............................. 95146331 A

(51) Int. Cl.
  *B29C 45/76* (2006.01)
(52) U.S. Cl. .................................... 425/546; 425/405.1
(58) Field of Classification Search ................. 425/546, 425/405.1, 405.2
  See application file for complete search history.

(56) References Cited

U.S. PATENT DOCUMENTS

| | | | | |
|---|---|---|---|---|
| 3,153,833 | A * | 10/1964 | Jackson, Sr. | 425/405.2 |
| 3,261,055 | A * | 7/1966 | Dart | 425/405.1 |
| 3,704,974 | A * | 12/1972 | Kotsur | 425/405.1 |
| 3,712,785 | A * | 1/1973 | Hirt et al. | 425/405.1 |
| 3,773,454 | A * | 11/1973 | Horve et al. | 425/546 |
| 4,009,981 | A * | 3/1977 | Rosen | 425/405.1 |
| 4,165,062 | A * | 8/1979 | Mitchell | 425/405.1 |
| 4,208,177 | A * | 6/1980 | Allen | 425/546 |
| 4,564,352 | A * | 1/1986 | Pettersson | 425/405.2 |
| 5,882,693 | A * | 3/1999 | Silkowski et al. | 425/546 |

* cited by examiner

*Primary Examiner*—Tim Heitbrink
(74) *Attorney, Agent, or Firm*—Troxell Law Office, PLLC

(57) ABSTRACT

An airtight mechanism of a mold-holding unit for forming a vacuum environment around a held mold, including: a base section; an elongated support section, one end of the support section being vertically fixedly connected with the base section; a top section bridged between the other end of the support section above the base section and in alignment therewith, a mold-holding space being defined between the top section and the base section, in which the mold is held; an airtight tubular chamber reciprocally linearly movable along an axes of the support section between an airtight position and an open position, whereby when positioned in the airtight position, the airtight tubular chamber is positioned in the mold-holding space around the held mold; a first closed end piece disposed on the base section and having a first closed connecting loop, whereby one end of the airtight tubular chamber in the airtight position coaxially airtight abuts against the first closed connecting loop; and a second closed end piece disposed on the top section and having a second closed connecting loop, whereby the other end of the airtight tubular chamber in the airtight position coaxially airtight abuts against the second closed connecting loop.

7 Claims, 6 Drawing Sheets

AIRTIGHT MECHANISM OF A MOLD-HOLDING UNIT FOR FORMING A VACUUM ENVIRONMENT AROUND A HELD MOLD

BACKGROUND OF THE INVENTION

The present invention is related to a polymer molding/processing technique, and more particularly to an airtight mechanism of a mold-holding unit for forming a vacuum environment around a held mold.

Taiwanese Utility Model Patent No. 093219334 discloses a middle heating disc module of a vacuum sulfur-adding machine. Such module utilizes a conventional vacuum chamber technique. Basically, such module includes a vertical mold-holding unit having an upper fixed mold seat. A guide column projects from lower side of the upper fixed mold seat. A vacuum chamber is slidably fitted on the guide column to provide airtight sealing effect for a mold positioned thereunder. An external negative pressure device is used to suck away the gas in the close space defined by the vacuum chamber. Accordingly, a vacuumized space is achieved for the polymer manufacturing/processing procedure.

The conventional technique is widely applied to the manufacturing. However, such structure is still not perfect. Mainly, for the mold-holding unit with the conventional vacuum chamber, it is necessary to reserve a considerable room under the upper fixed mold seat, in which the vacuum chamber can be disposed. Under such circumstance, the mold-holding unit must have a considerable total height. This makes it inconvenient to maintain and operate the mold-holding unit.

SUMMARY OF THE INVENTION

It is therefore a primary object of the present invention to provide an airtight mechanism of a mold-holding unit for forming a vacuum environment around a held mold. By means of the airtight mechanism, the total height of the mold-holding unit is reduced to facilitate operation and maintenance.

According to the above object, the airtight mechanism of the mold-holding unit for forming the vacuum environment around the held mold of the present invention includes: a base section; an elongated support section, one end of the support section being vertically fixedly connected with the base section; a top section bridged between the other end of the support section above the base section and in alignment therewith, a mold-holding space being defined between the top section and the base section, in which the mold is held; an airtight tubular chamber reciprocally linearly movable along an axes of the support section between an airtight position and an open position, whereby when positioned in the airtight position, the airtight tubular chamber is positioned in the mold-holding space around the held mold; a first closed end piece disposed on the base section and having a first closed connecting loop, whereby one end of the airtight tubular chamber in the airtight position coaxially airtight abuts against the first closed connecting loop; and a second closed end piece disposed on the top section and having a second closed connecting loop, whereby the other end of the airtight tubular chamber in the airtight position coaxially airtight abuts against the second closed connecting loop.

The present invention can be best understood through the following description and accompanying drawings wherein:

DETAILED DESCRIPTION OF THE PREFERRED EMBODIMENTS

Figure 1:
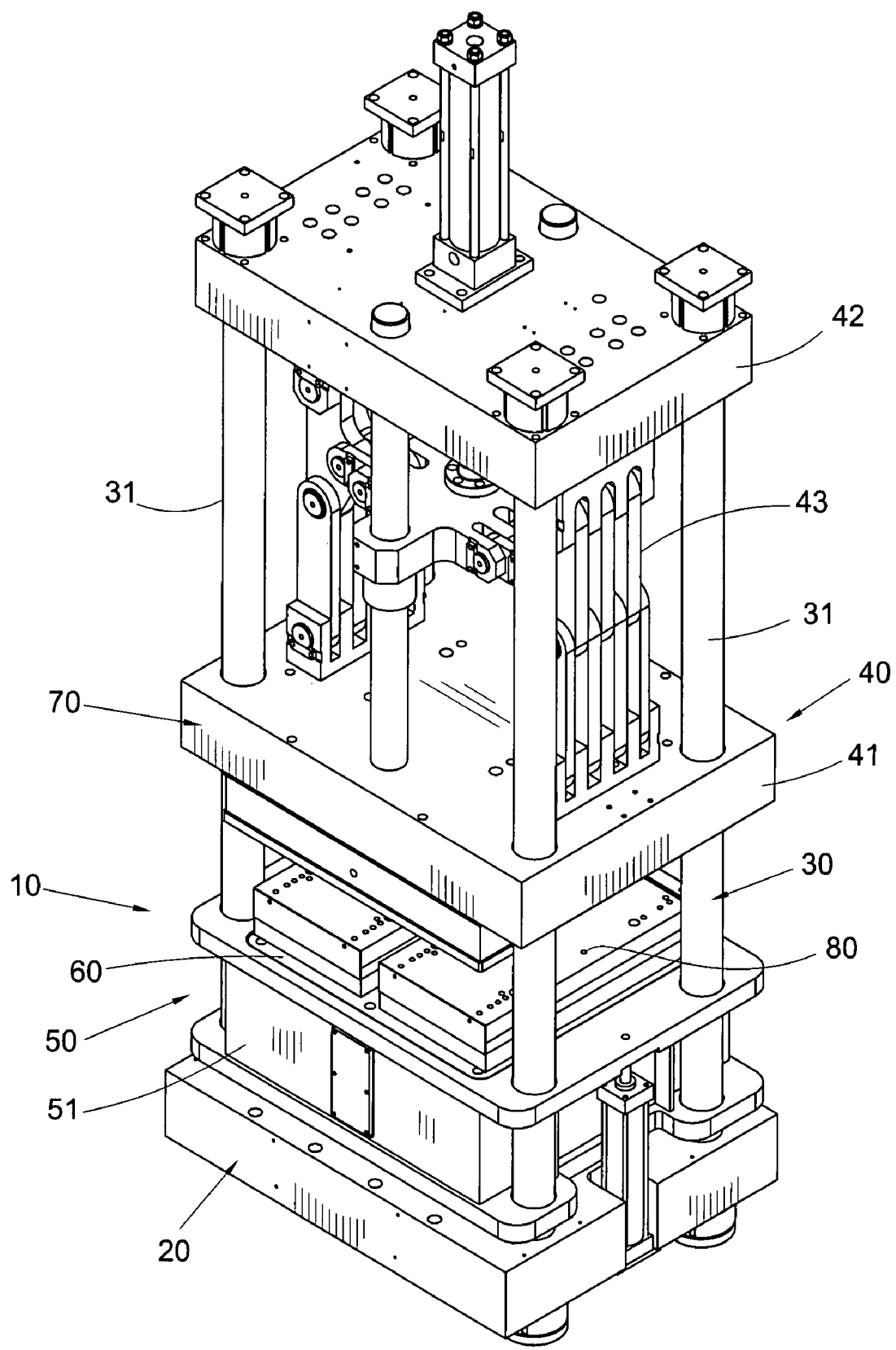
FIG. 1 is a perspective view of a first embodiment of the airtight mechanism of the present invention, which is applied to a mold-holding unit.

Please refer to FIGS. 1 to 4. According to a first embodiment, the airtight mechanism 10 of the mold-holding unit for forming a vacuum environment around the held mold of the present invention includes a base section 20, a support section 30, a top section 40, an airtight tubular chamber 50 and first and a second closed end pieces 60, 70.

The base section 20 has a bottom block 21. Two sets of bottom mold ascending/descending pieces are arranged on the bottom block 21 side by side for lifting the mold held by the mold-holding unit. This pertains to prior art and will not be further described hereinafter.

The support section 30 has four parallel guide columns 31. The bottom ends of the guide columns 31 are vertically fixedly connected with the bottom block 21.

The top section 40 has a board-like upper mold seat 41 slidably fitted on the guide columns 31. A fixed top board 42 is fixedly bridged between the top ends of the guide columns 31. An elbow assembly 43 is interconnected between the upper mold seat 41 and the fixed top board 42 for driving the upper mold seat 41 to move along the guide columns 31. This also pertains to prior art.

The airtight tubular chamber 50 has a tubular chamber body 51 with an upper open end and a lower open end. The chamber body 51 is positioned between the guide columns 31 around the bottom mold ascending/descending pieces 22. Four bushes 52 are respectively fixed on the periphery of the chamber body 51 and coaxially slidably fitted on the corresponding guide columns 31. By means of the bushes 52, the chamber body 51 is slidably mounted on the support section 30 and is reciprocally movable along the axes of the guide columns 31 between an airtight position and an open position. Two pressure cylinders 53 drivable by fluid pressure are fixed on the bottom block 21. The power output shafts of the pressure cylinders 53 are connected with the chamber body 51 for driving the chamber body 51 to slide.

The first closed end piece 60 has a first sealing board 61 with a shape corresponding to the shape of the internal space of the chamber body 51. The first sealing board 61 is mounted on the bottom block 21. The axis of the chamber body 51 is normal to the first sealing board 61. A first closed connecting loop 62 is positioned along the periphery of the first sealing board 61. The first sealing board 61 is formed with four shaft holes 63 passing through the first sealing board 61 from one face to the other face. The shafts of the bottom mold ascending/descending pieces pass through the shaft holes 63 to drive and ascend/descend the mold assembly 80 positioned above the first closed end piece. The first closed connecting loop 62 has a looped first insertion groove 621 and a looped first airtight ring 622 inlaid in the insertion groove 621.

The second closed end piece 70 has a looped extending skirt 71 with a shape corresponding to the shape of the chamber body 51. One end of the extending skirt 71 is fixedly connected with the upper mold seat 41 and coaxial with the chamber body 51. A second closed connecting loop 72 is disposed on the other end of the extending skirt 71. The second closed connecting loop 72 has a looped second insertion groove 721 formed the other end of the extending skirt 71 and a second airtight ring 722 inlaid in the second insertion groove 721.

According to the above arrangement, the mold held by the mold-holding unit is positioned in the mold-holding space defined between the top section and the base section. The mold sections are respectively arranged on the bottom mold ascending/descending pieces 22 and the upper mold seat 41. The mold is held in a conventional manner. This pertains to prior art. However, it is linked with the technical characteristics of the present invention. Therefore, the main technical characteristics of the present invention will be further described on the basis of the opening/closing state of the held mold.

When the mold-holding unit is in a mold-closed state, the upper mold seat 41 is moved downward to the bottom mold ascending/descending pieces. Accordingly, the held mold 80 keeps in a closed state between the upper mold seat 41 and the bottom mold ascending/descending pieces. At this time, the second closed end piece 70 is also moved downward to a corresponding position along with the upper mold seat 41. Then, the pressure cylinders 53 drive the chamber body 51 from the open position to the airtight position. When the chamber body 51 is moved to the airtight position, the chamber body 51 is positioned in the mold-holding space around the held mold. At this time, the top end of the chamber body 51 abuts against the second airtight ring 722 of the second closed connecting loop 72. Also, the inner side of the wall of the bottom end of the chamber body 51 abuts against the first airtight ring 622 of the first closed connecting loop 62. Accordingly, the upper and lower openings of the chamber body 51 are respectively airtight sealed by the second and first closed connecting loops 72, 62. Therefore, an airtight closed space is defined between the first and second closed end pieces 60, 70 and the chamber body 51. Under such circumstance, by means of the external negative pressure unit, the air in the closed space can be sucked away to form a vacuum environment for the held mold.

With respect to the above airtight mechanism 10 of the mold-holding unit for forming a vacuum environment around the held mold, there are two things which be should emphasized. First, it is unnecessary to add any guide column to the airtight mechanism 10 specifically for the vacuum chamber as in the conventional technique. Also, it is unnecessary to reserve a moving space specifically for the vacuum chamber. With the existent mold-holding unit, the original support section 30 serves to provide a guiding effect. The chamber member can be disposed in the already existent space for the bottom mold ascending/descending pieces. Therefore, the total height of the present invention is much smaller than that of the conventional vacuum chamber with respect to the same mold-holding unit. This facilitates operation and maintenance of the unit.

Second, when the chamber 50 is moved to the open position, the chamber body 51 is moved downward to a quite low position. At this time, the face of the first sealing board 61 is exposed. Accordingly, an operator can easily clean up the first sealing board 61. This is because the first sealing board 61 is positioned under the held mold. When cleaning up the mold, in case some impurities drop onto the face of the first sealing board 61, the first sealing board 61 of the airtight mechanism 10 of the present invention is fully exposed to facilitate the cleaning operation.

Figure 2:
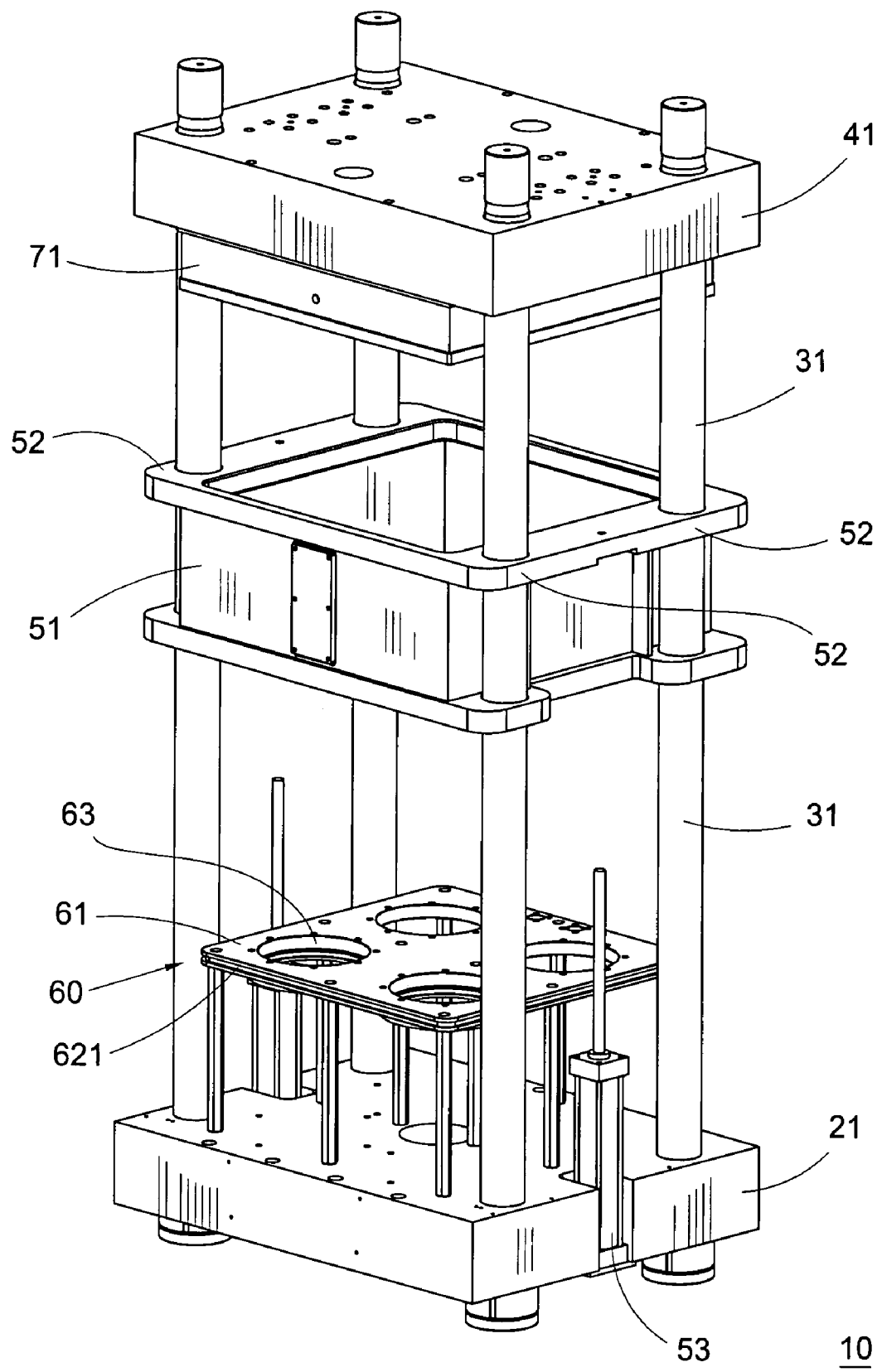
FIG. 2 is a perspective view of the first embodiment of the airtight mechanism of the present invention.
Figure 3:
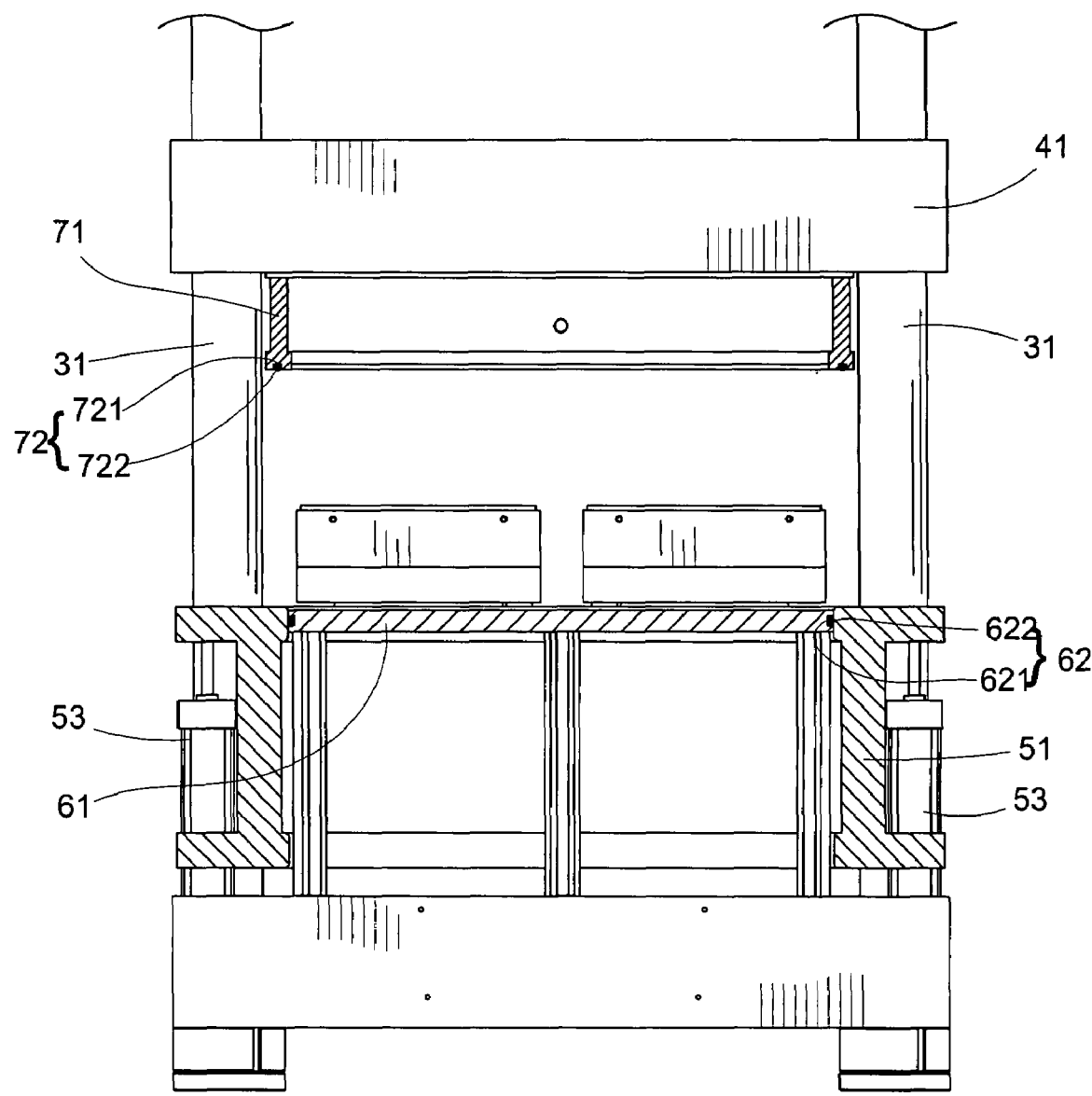
FIG. 3 is a sectional view of the first embodiment of the airtight mechanism of the present invention, showing that the airtight tubular chamber is positioned in the open position.
Figure 4:
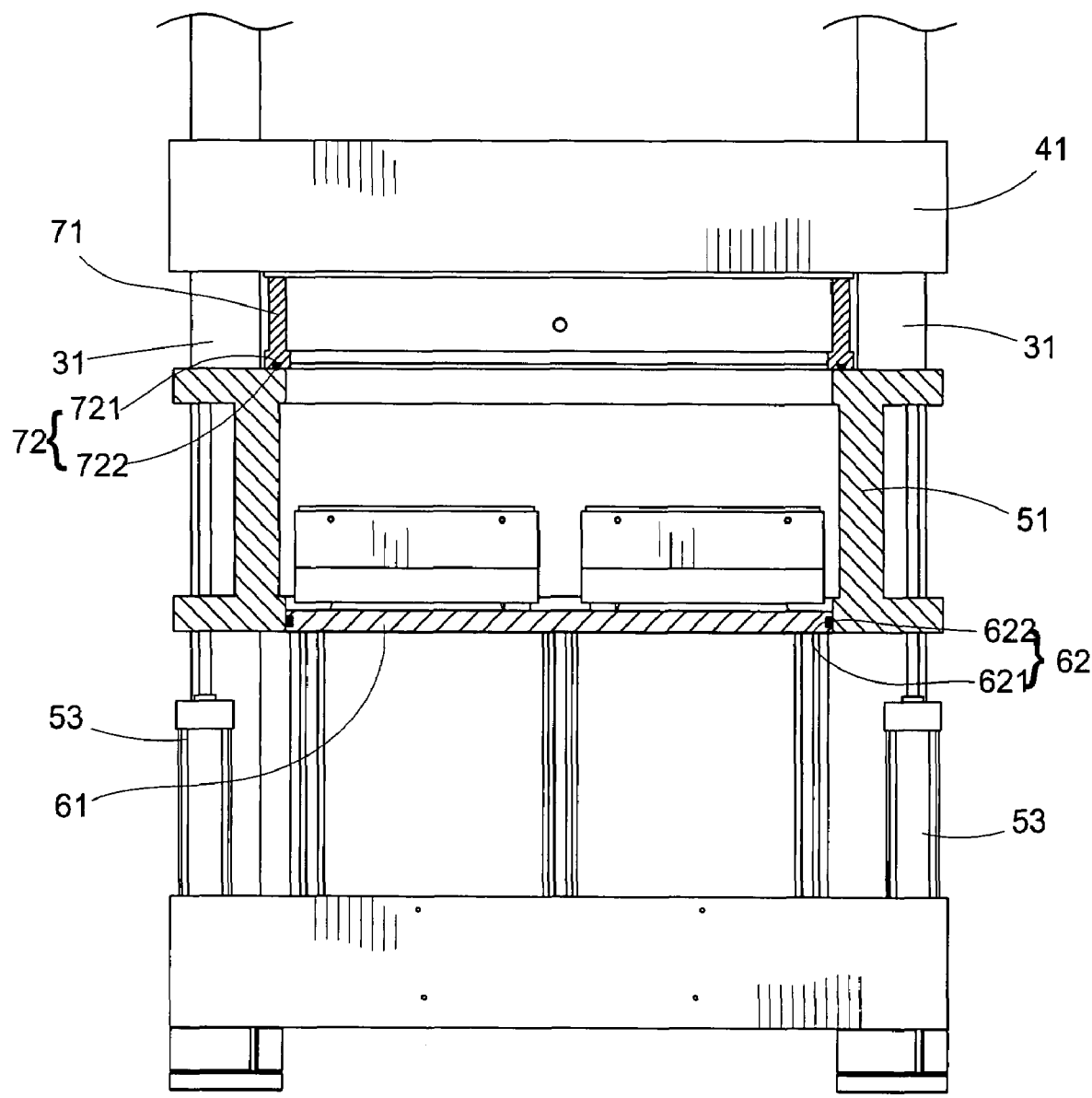
FIG. 4 is a sectional view of the first embodiment of the airtight mechanism of the present invention, showing that the airtight tubular chamber is positioned in the airtight position.
Figure 5:
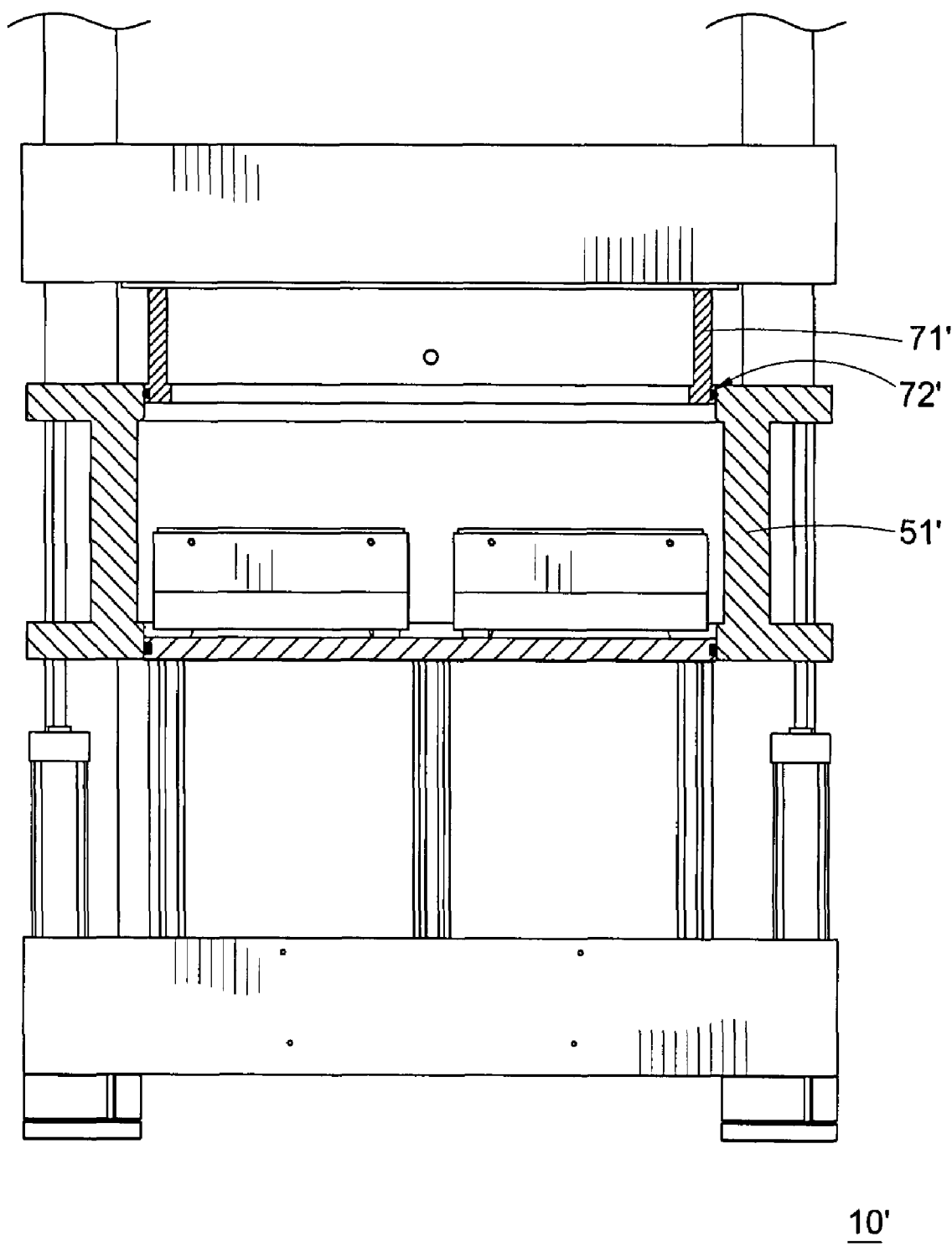
FIG. 5 is a sectional view of a second embodiment of the airtight mechanism of the present invention.
Figure 6:
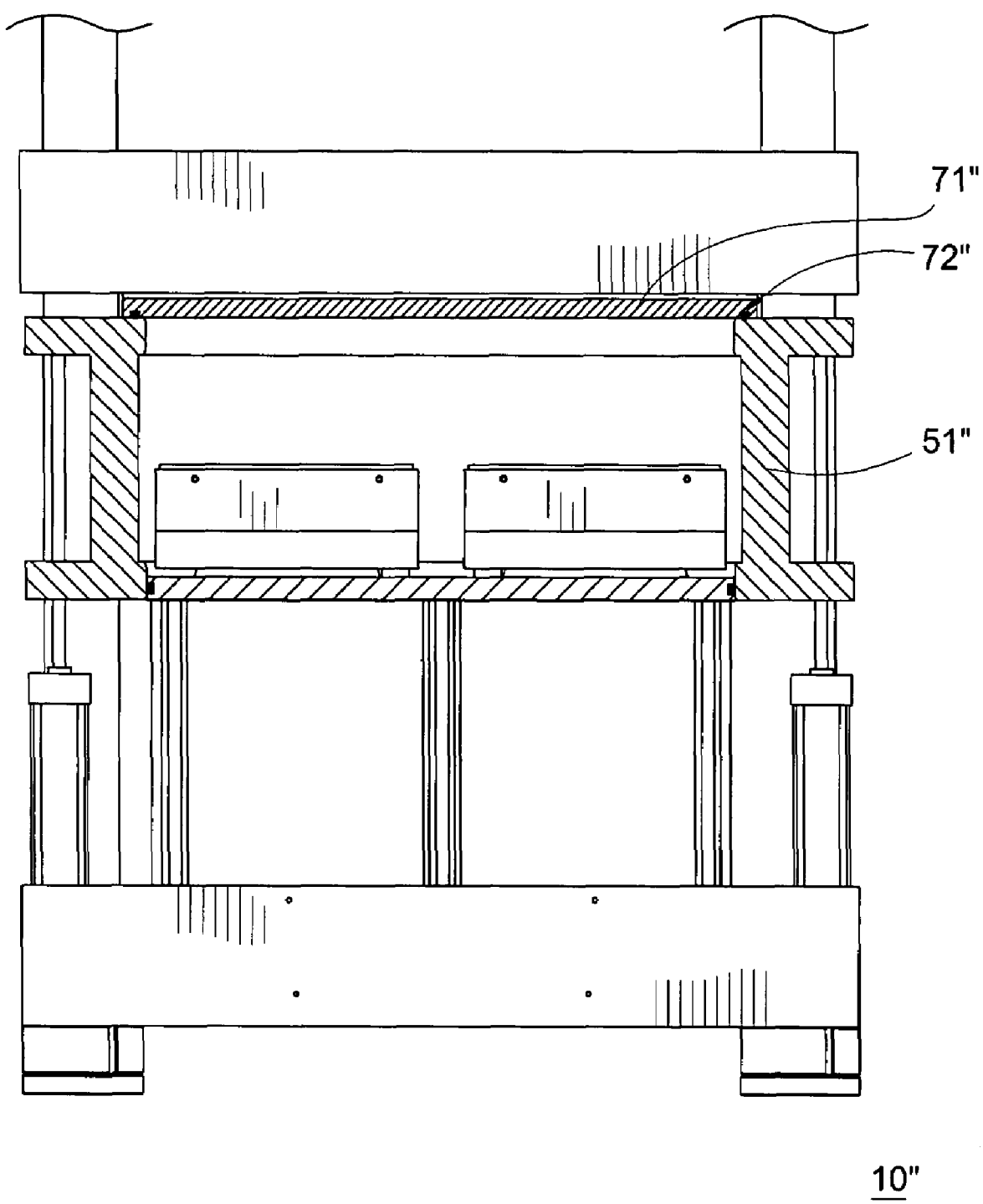
FIG. 6 is a sectional view of a third embodiment of the airtight mechanism of the present invention.

FIGS. 5 and 6 respectively show a second and a third embodiments of the airtight structure of the present invention. In FIG. 2, the inner side of the wall of the top end of the chamber body 51' abuts against the second closed connecting loop 72'. In FIG. 3, the second closed end piece 70" simply has a plane second sealing board 71" and the second closed connecting loop 72". Both these equivalent structures are included in the scope of the present invention.

The above embodiments are only used to illustrate the present invention, not intended to limit the scope thereof. Many modifications of the above embodiments can be made without departing from the spirit of the present invention.

What is claimed is:

1. An airtight mechanism of a mold-holding unit for forming a vacuum environment around a held mold, comprising:
   a base section;
   an elongated support section, a first end of the support section being vertically fixedly connected with the base section;
   a top section bridged between a second end of the support section above the base section and in alignment therewith, a mold-holding space being defined between the top section and the base section, in which the mold is held;
   an airtight tubular chamber reciprocally linearly movable along an axes of the support section between an airtight position and an open position, whereby when positioned in the airtight position, the airtight tubular chamber is positioned in the mold-holding space around the held mold;
   a first closed end piece disposed on the base section, the first closed end piece having a first closed connecting loop, whereby a first end of the airtight tubular chamber in the airtight position coaxially airtight abuts against the first closed connecting loop; and
   a second closed end piece disposed on the top section, the second closed end piece having a second closed connecting loop, whereby a second end of the airtight tubular chamber in the airtight position coaxially airtight abuts against the second closed connecting loop.

2. The airtight mechanism of the mold-holding unit for forming the vacuum environment around the held mold as claimed in claim 1, wherein the airtight tubular chamber is coaxially slidably mounted on the support section.

3. The airtight mechanism of the mold-holding unit for forming the vacuum environment around the held mold as claimed in claim 2, wherein the support section includes several guide columns and the airtight tubular chamber includes a tubular chamber body positioned between the guide columns, the chamber body having an axis parallel to the axes of the guide columns, several bushes being respectively fixed on the chamber body and coaxially slidably fitted on the corresponding guide columns.

4. The airtight mechanism of the mold-holding unit for forming the vacuum environment around the held mold as claimed in claim 1, wherein an outer diameter of the first closed connecting loop is substantially equal to an inner diameter of one end of the airtight tubular chamber.

5. The airtight mechanism of the mold-holding unit for forming the vacuum environment around the held mold as claimed in claim 1, wherein the second closed connecting loop coaxially abuts against the second end of the airtight tubular chamber.

6. The airtight mechanism of the mold-holding unit for forming the vacuum environment around the held mold as claimed in claim 1, wherein the second closed connecting loop coaxially abuts against an inner side of the wall of the second end of the airtight tubular chamber.

7. The airtight mechanism of the mold-holding unit for forming the vacuum environment around the held mold as claimed in claim 1, wherein the second closed end piece has a looped extending skirt coaxially in alignment with the airtight tubular chamber, a first end of the extending skirt being connected with the top section, the second closed connecting loop being disposed on a second end of the extending skirt, whereby the second end of the airtight tubular chamber in the airtight position coaxially airtight abuts against the second closed connecting loop.

* * * * *